July 28, 1959  L. W. FREIBOTT  2,896,222
ADJUSTABLE HANDLE AND MOUNTING FLANGE
CONSTRUCTION FOR SHOWER VALVES
Filed June 9, 1958

INVENTOR.
LEONARD W. FREIBOTT
BY
ATTORNEYS

United States Patent Office 2,896,222
Patented July 28, 1959

2,896,222

ADJUSTABLE HANDLE AND MOUNTING FLANGE CONSTRUCTION FOR SHOWER VALVES

Leonard W. Freibott, West Covina, Calif., assignor to Crown City Die Casting Co., Pasadena, Calif., a partnership Application June 9, 1958, Serial No. 740,841

3 Claims. (Cl. 4—191)

This invention relates to adjustable handle and mounting flange construction for shower valves.

It is the conventional practice, particularly when installing shower valves in new construction, to "rough in" the shower valves before plastering or tiling. After the wall is finished, the covering flanges or adapters and handles are installed on the protruding shower valves. There is a great variation in the length of the protruding portions of the shower valves. As a consequence, it has been necessary to utilize screw-threaded mounting nipples which must be individually cut to compensate for this variation. Cutting the nipples "on the job" is costly, the screw threads are mutilated, and each installation becomes a time-consuming operation.

A primary object of the present invention is to provide an adjustable handle and mounting flange construction which permits the use of a screw-threaded mounting nipple of standard length even though the extent of protrusion of the shower valve may vary over a wide range, whereby the time and labor of installing shower valve fittings or bath valve fittings are reduced to a minimum.

A further object is to provide an adjustable handle and mounting flange wherein the valve stem is entirely concealed by the handle for all adjusted positions of the handle.

With the above and other objects in view, as may appear hereinafter, reference is directed to the accompanying drawing in which.

Figure 3:
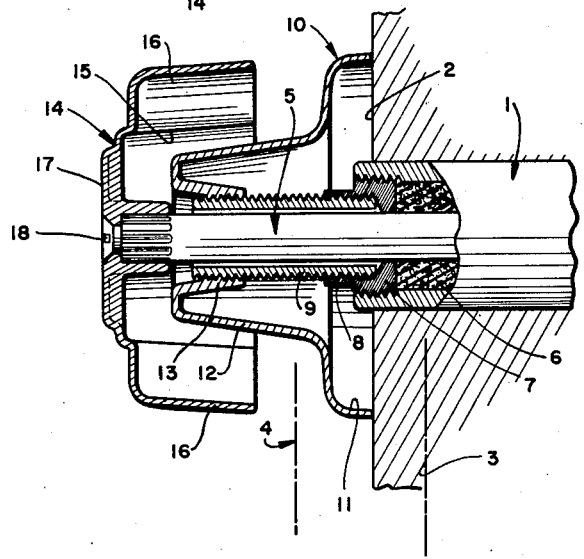
Figure 3 is a sectional view of the mounting flange and handle shown attached to a shower valve, the valve being shown fragmentarily, and also indicating by broken lines the minimum and maximum wall line to which the valve handle and mounting flange construction may be adapted.

In the installation of shower valves, and bathtub valves as well, the shower valves or bathtub valves, which are usually dual valves for connection to hot water and cold water supply, are "roughed in" prior to plastering or tiling the shower or bathroom wall. As a consequence, the distance the valve stem or stems protrude from the wall vary substantially. For example, as indicated in Figure 3, a valve body 1, indicated fragmentarily, may be almost flush with a wall face 2, as indicated by solid lines, or may project therefrom so that the wall face is located at 3 in Figure 3, or may in some instances actually be within the wall face, as indicated by 4 in Figure 3. In the latter case, the plaster or tile must often be cut away from in front of the valve body 1.

The conventional valve body 1 carries a valve stem 5 which protrudes a substantial distance therefrom. Within the valve body 1 the valve stem 5 is surrounded by packing 6 held in place by a packing nut 7. The packing nut projects from the valve body 1 a sufficient distance to receive a wrench, or the like, and is provided with an internally screw-threaded socket 8, which receives a screw-threaded nipple 9 which surrounds the valve stem 5, so that the valve stem is capable of rotating freely therein.

In the exercise of the present invention, the nipple 9 is surrounded by a mounting flange 10 which includes a flared hollow base 11 adapted to bear against the wall face 2. Centered in the base 11 is a tapered hollow boss 12. The extremity of the boss 12 is provided with a re-entrant boss 13 which is internally screw-threaded for connection to the nipple 9.

The extremity of the valve stem 5 receives a handle member 14 which is provided with a tapered skirt 15 of substantial axial length and of a diameter to clear the tapered boss 12. The skirt 15 is provided with radiating lobes 16 so that the handle may be readily gripped for turning. Centered in the handle 14 is a re-entrant fluted boss 17 which mates with corresponding flutes provided at the extremity of the valve stem 5. A screw 18 secures the handle member 14 on the valve stem 5.

Installation of the adjustable handle and mounting flange construction is as follows:

The nipple 9 is screwed into the packing nut 7. The mounted flange 10 is screwed onto the nipple 9 until the base 11 is in engagement with the wall face 2. It will be observed that if the wall face 2 is located in the plane designated 3 that the flange 10 is screwed a substantial distance onto the nipple 9, whereas if the plane of the wall be located at 4 the nipple 9 is screwed only partially into the packing nut 7 and into the screw-threaded boss 13.

Figure 1:
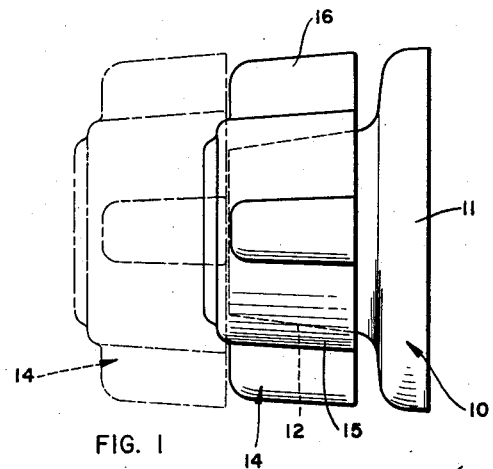
Figure 1 is a side elevational view of the handle and mounting flange construction, the construction being shown by solid lines in its retracted position and by broken lines in its fully extended position.
Figure 2:
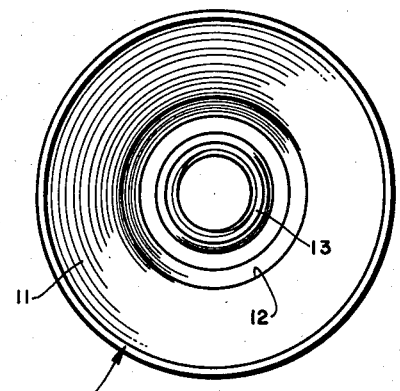
Figure 2 is a bottom view of the mounting flange.

If the wall face be located at 3, then the valve stem 5 protrudes a maximum distance so that when the handle member 14 is mounted it occupies substantially the broken line position, relative to the mounting flange 10 shown in Figure 1. When the wall face is located at 4, the handle member 14 occupies substantially the position relative to the mounting flange 10 shown by solid lines in Figure 1.

It will be seen from Figure 1 that the axial length of the skirt 15 and the height of the boss 12 is such that there need not be an open traverse space between the handle member 14 and the mounting flange 10, even though the location of the wall may vary a substantial distance as represented by the distance between the planes 3 and 4. It will also be observed that the same length of nipple may be employed even though the location of the wall face may vary from the plane 3 to the plane 4; and that throughout this range of wall face location, installation of the mounting flange 10 and handle member 19 may be made without cutting the nipple 9 or substituting nipples of different lengths, as a consequence installation time is reduced to a minimum.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An adjustable handle and mounting flange construction for valves having a valve stem and a nipple surrounding said stem and protruding therewith from a wall face, said construction comprising: a mounting flange having a relatively flat flared base, an elongated hollow boss of reduced diameter encompassing said nipple, and a re-entrant sleeve joined to the extremity of said boss and directed within said boss toward said base, said sleeve being axially adjustable on said nipple to place said base against said wall face; and a valve stem member having means for attachment to said handle and an elongated skirt axially overlapping said hollow boss said skirt and hollow boss cooperating to conceal said valve stem and nipple throughout a predetermined variation in distance of the end of said stem from said wall face.

2. An adjustable handle and mounting flange construction for a valve as set forth in claim 1, wherein: the attachment means for said handle member is a re-entrant boss; said re-entrant sleeve has an internal diameter dimensioned to clear said boss whereby said handle member and base are axially adjustable to a position wherein said boss and re-entrant sleeve telescope.

3. An adjustable handle and mounting flange construction for valves as set forth in claim 1, wherein: said nipple and re-entrant sleeve are screw-threaded for axial adjustment.

References Cited in the file of this patent

UNITED STATES PATENTS

| | | |
|---|---|---|
| 922,471 | Glauber | May 25, 1909 |
| 1,414,792 | Seither | May 2, 1922 |
| 1,552,501 | Panhorst | Sept. 8, 1925 |

FOREIGN PATENTS

| | | |
|---|---|---|
| 112,062 | Great Britain | Dec. 27, 1917 |